United States Patent [19]

Kohn

[11] Patent Number: 4,700,386

[45] Date of Patent: Oct. 13, 1987

[54] TECHNIQUE FOR PROMOTING CATV PAY-PER-VIEW EVENTS AND ACKNOWLEDGING SUBSCRIBER ORDERS

[75] Inventor: Elliott S. Kohn, Murrysville Boro, Pa.

[73] Assignee: Westinghouse Electric Corp., Pittsburgh, Pa.

[21] Appl. No.: 745,359

[22] Filed: Jun. 14, 1985

[51] Int. Cl.⁴ .......................................... H04N 7/167
[52] U.S. Cl. ..................................... 380/10; 380/15; 380/20
[58] Field of Search ................. 358/120, 114, 122, 84, 358/86

[56] References Cited

U.S. PATENT DOCUMENTS

| | | | |
|---|---|---|---|
| 3,485,941 | 12/1969 | Bass | 358/120 |
| 4,333,107 | 6/1982 | McGuire et al. | 358/120 |
| 4,458,268 | 7/1984 | Ciciora | 358/120 |
| 4,471,379 | 9/1984 | Stephens | 358/120 |
| 4,536,791 | 8/1985 | Campbell et al. | 358/114 |

Primary Examiner—Stephen C. Buczinski
Assistant Examiner—Melissa L. Koltak
Attorney, Agent, or Firm—M. P. Lynch

[57] ABSTRACT

In CATV systems employing one-way addressable converters in a subscriber's premise, a computer at the system head-end develops tagged messages for display on the subscriber's television to both promote upcoming pay-per-view events and to acknowledge a subscriber's order for the pay-per-view event.

5 Claims, 8 Drawing Figures

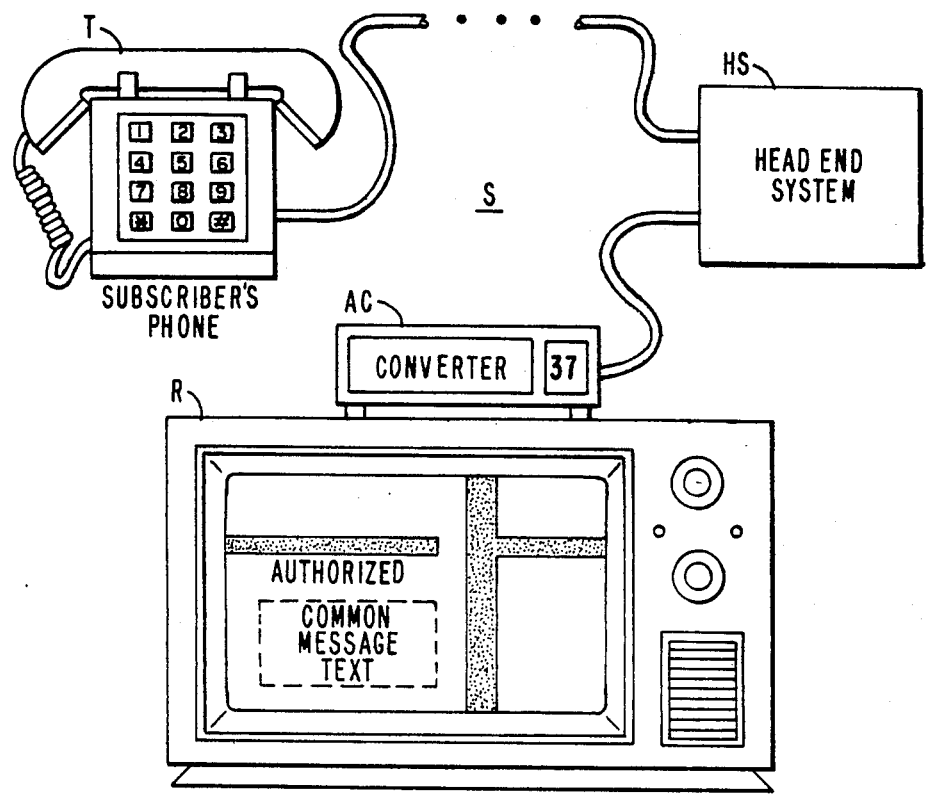
FIG. IA
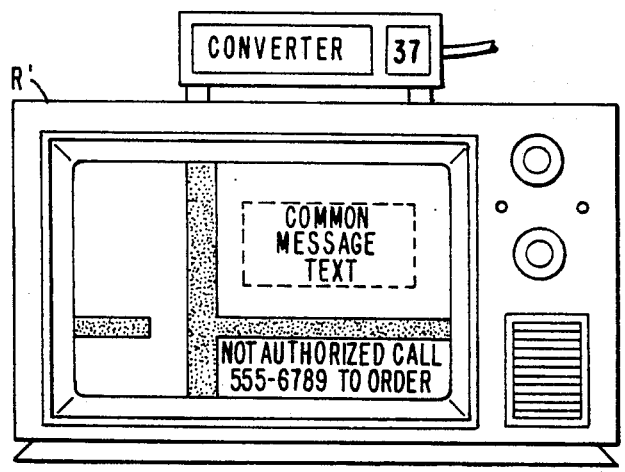
FIG. IB

TECHNIQUE FOR PROMOTING CATV PAY-PER-VIEW EVENTS AND ACKNOWLEDGING SUBSCRIBER ORDERS

BACKGROUND OF THE INVENTION

Conventional cable television programming made available to subscriber premises includes basic service available to all subscribers, and premium service, such as a movie channel, which is available in return for a monthly fee. The base service and premium service can be handled on a monthly billing basis which entitles the subscriber to all events and programming on the specified channels for the month-long period. A recent marketing strategy for cable television consists of pay-per-view wherein a subscriber is offered the opportunity to select a specific program, such as a sporting event, to be made available at a select time on a select date. The pay-per-view offering typically permits a subscriber to request the special event during a period of time preceding the scheduled event. A separate one-time fee is then charged against the subscriber's account. While two-way cable television systems permit direct subscriber orders over the cable, the vast majority of subscribers with addressable one-way cable television converters request pay-per-view events via the telephone or mail. The telephone or mail-order request for pay-per-view events does not provide a timely or reliable acknowledgement to the subscriber that the pay-per-view request has been received and implemented.

SUMMARY OF THE INVENTION

There is described herein with reference to the accompanying drawings, a novel technique for providing acknowledgement of a subscriber's request fo a pay-per-view event in a system employing one-way addressable converters.

The video signals transmitted via the pay-per-view channel are scrambled at the cable television head end. Typically, the scrambling is achieved through one of several sync suppression or sync offset techniques implemented at the system head end. The decoder in the subscriber's addressable converter may be of a type which passes the scrambled signal to the television receiver, or may be of a type which blocks passage of scrambled signals.

In systems where the decoder passes the scrambled signals, the absence of identifiable sync information in the program video received by the television receiver prevents the receiver from locking onto the video signals and thus results in a rolling or distorted video presentation. The descrambling at the addressable converter in response to a head end authorization signal restores the conventional sync information required for the television receiver to present a stable video/audio program.

In the absence of a subscriber's request for the pay-per-view event, the signals are passed through the subscriber's addressable converter as scrambled signals to the subscriber's television receiver causing a first message text to be displayed. Though scrambled pictures are not normally stable, this display is stable and readable for reasons described below. The message text promotes the upcoming pay-per-view event.

Upon request from the subscriber, the descrambling circuitry in the addressable converter is authorized to descramble the video signals transmitted on the pay-per-view event channel causing a second stable message text to be displayed to acknowledge receipt of the subscriber's request.

The novel technique disclosed herein for providing subscriber acknowledgement of requested pay-per-view events employs a video pattern generator, such as a computer, for producing a separate video pattern for each pay-per-view event. The video pattern includes a vertical and horizontal bar, produced by the graphics capability of the coputer, and a first and second message text. The video pattern is transmitted as a scrambled signal to the addressable converter at a subscriber's premises. In the absence of a subscriber request for the pay-per-view event, the vertical and horizontal bars of the video pattern are mistakenly recognized as sync information by the subscriber's television receiver causing the receiver to lock on the bars of the video pattern and producing a stable, readable presentation of the first message text. This text typically identifies the upcoming pay-per-view event and includes information to enable the subscriber to request the pay-per-view event. The computer also generates a tag number which is specifically assigned to the event. The tag number is applied to the external tag input of the encoder of the pay-per-view channel.

In response to a subscriber's request for the pay-per-view event, the addressable converter is authorized to descramble the video pattern associated with the tag corresponding to the requested event, and the subscriber's television receiver locks onto the conventional sync information of the descrambled video format causing the second message text to be presented in a stable readable form. The second message text typically acknowledges receipt of the subscriber's request for the selected pay-per-view event. The acknowledgment of the subscriber's request may be entered by an operator in response to a subscribers telephone call or it may be automatically entered by a touch-tone voice response equipment at the cable head end system.

The message texts may include other information such as paid advertising.

DESCRIPTION OF THE DRAWINGS

The invention will become more readily apparent from the following exemplary description in connection with the accompanying drawings:

FIG. 1A is a pictorial illustration of a CATV subscriber system embodiment of the invention with a television display acknowledging a subscriber's request for a pay-per-view event;

FIG. 1B is a television display of a pay-per-view event offering generated in accordance with the disclosed invention;

FIGS. 3A and 3B are waveform illustrations of a normal video waveform and a sync suppressed video waveform respectively, while

DESCRIPTION OF THE PREFERRED EMBODIMENTS

Referring to FIG. 1A, there is pictorially illustrated a cable television subscriber system S wherein cable programming via predetermined channels is supplied from a cable television head end system HS to the addressable converters AC associated with the television receiver R of a community of CATV subscribers. The addressable converters AC include descambling circuitry which responds to program authorization signals from the head end system HS to descramble video/audio programming requested by the local subscriber. The request for pay-per-view or a special programming may be initiated by the home subscriber in a one-way addressable CATV system via the telephone T.

In the pay-per-view authorization and acknowledgement technique disclosed herein, a stable readable first message text displayed under scrambled signal conditions, as shown in the television receiver R' of FIG. 1B, informs the local subscriber of an available upcoming pay-per-view event. The message text displayed under scrambled programming conditions identifies the upcoming pay-per-view event and indicates what action the local subscriber should take to request the event. A second message text corresponding to a descrambled video signal presentation, as shown on the television receiver R, is presented to inform the local subscriber that his request for the pay-per-view event has been received and authorized.

Figure 2:
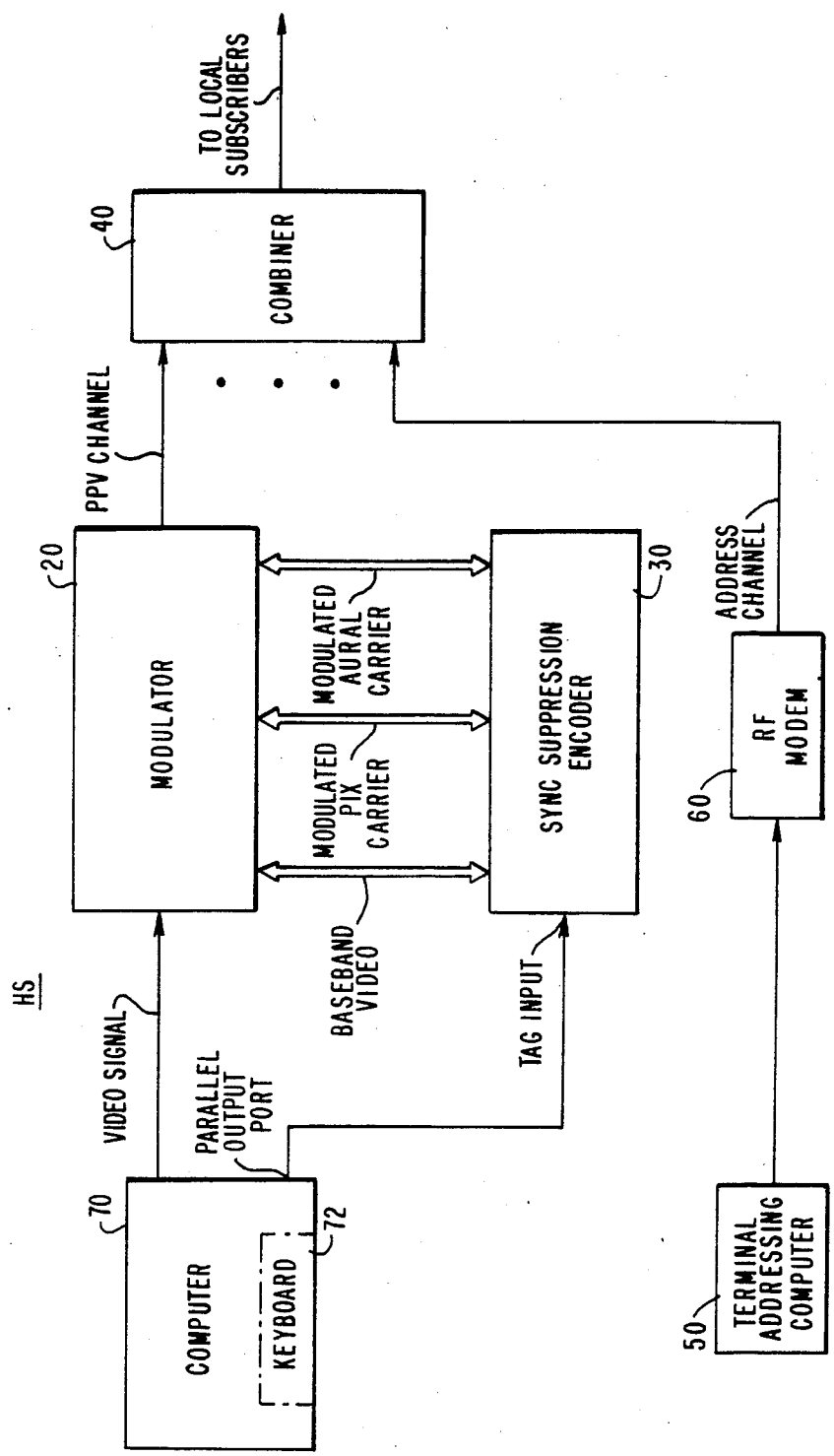
FIG. 2 is a functional block diagram of a cable television system employing the invention.

A typical implementation of the multi-text stable displays of FIGS. 1A and 1B in a one-way addressable cable system is illustrated in the functional block diagram of FIG. 2. Numerous combinations of modulators and sync suppression encoders function to provide cable television program inputs to a combiner 40 which transmits the cable television program service to the local subscribers of a cable television system. The modulator 20 and sync suppression encoder 30 of FIG. 2 develop the pay-per-view (PPV) channel input to the combiner 40. In the one-way addressable system disclosed, the terminal addressing computer 50 generates logic level outputs which are transmitted via the RF modem 60 to the combiner 40. The modem 60 generates the address channel for the respective program inputs to the combiner 40. The outputs of the modulators are delivered via the combiner 40 to all the addressable converters of the subscriber locations. the video source for most scrambled CATV programming channels is likely to be baseband video and audio from a satellite earth station wherein the video and audio signals are applied to the video and audio input terminals respectively of the corresponding modulator.

Figure 3A:
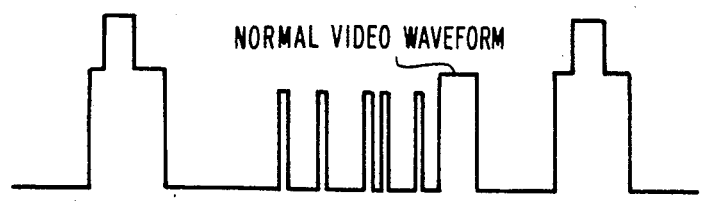
Figure 3B:
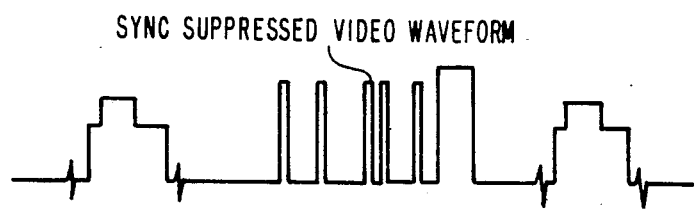
Figure 3C:
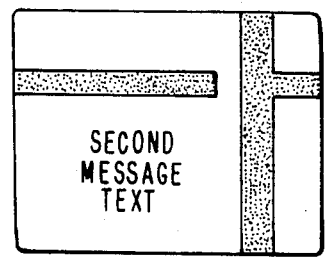
FIG. 3C is a message text display depicting acknowledgment of a subscriber's request and FIG. 3D is a message text display depicting promotion of a pay-per-view event.
Figure 3D:
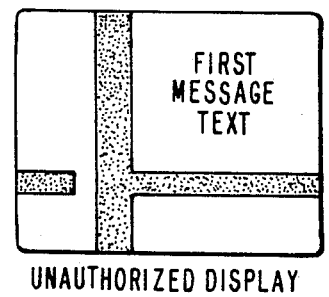

Scrambling of the signals on the pay-per-view channel may typically be achieved through sync offset or sync suppression. A video signal consisting of normal horizontal blanking and sync intervals is shown in FIG. 3A. This is one line of the video field whose prominent feature is a vertical bar with text information corresponding to the second text message developed by the computer 70. The sync suppression encoder 30 changes the video waveform to that shown in FIG. 3B where the levels of the horizontal blanking and sync information are below the level of the video pattern. Most sync-suppressed signals, if presented to a TV receiver without authorization for descrambling, would result in an unstable twisting display since the receiver is denied the sync information required to lock the video signal and provide a stable display. However the bars produced via the graphics capability of the computer 70 appear to the television receiver as sync pulses and are mistaken by the television receiver for horizontal and vertical sync information. The vertical bar is thus present during the horizontal blanking interval of the television receiver and is thus not visible on the television screen. Instead, the suppressed sync information at the right and left portion of FIG. 3B is visible on the screen and is, in fact, stable.

The implementation of the disclosed technique for both promoting a pay-per-view event and acknowledging subscriber's request for a pay-per-view event employs the standard head-end system described above in combination with a video pattern generator 70.

The video pattern generator 70, which may be typically implemented through the use of a commercially-available small computer, such as the Commodore 64, includes an operator entry keyboard 72 and standard computer graphics capability. The special video pattern generated by the computer 70 in response to operator input is supplied through the modulator 20, the output of which appears on the pay-per-view event channel input to the combiner 40. The computer 70, in accordance with the flow diagram F1–F5 of FIG. 4, utilizes conventional computer graphics capability to develop a vertical and horizontal bar pattern. The operator utilizes the entry keyboard 72 to enter at least a first and second message text for each pay-per-view event relative to the bar pattern and a tag identification. The use of tagging, which is an established practice in the cable industry, makes it possible to link the pay-per-view event promotion with the actual pay-per-view event even though the two may be on at different times and possibly on different channels.

In response to the operator input, the computer 70 generates a video pattern output consisting of the graphics and the text messages, and the output tag number identifying the pay-per-view event corresponding to the text. The computer 70 outputs the tag number in a form that can be directly accepted by the sync suppression encoder 30. This form is commonly binary-coded-decimal with parallel inputs to the encoder. If video patterns for more than one upcoming pay-per-view events are developed, the computer generates separate patterns pertinent to the individual events and sequences them with each being displayed for a sufficient period of time to enable the local subscriber to read the text. The tag numbers are transmitted to the encoder 30 in synchronism with the upcoming pay-per-view events transmitted via the modulator 20 and the combiner 40 to the local subscriber television receiver.

Referring to FIGS. 1A and 1B, the black horizontal and vertical bars developed by the computer 70 are shown in the form of a non-standard and non-interlaced sync. The scrambled unauthorized pay-per-view first message text is presented to the television receiver R' relative to the horizontal black bar representing vertical sync.

The television receiver mistakenly locks onto the vertical and the horizontal bar pattern generated by the computer 70 to establish a stable readable video display. The first message text message is displayed as a readable, stable video display by the local television receiver in the absence of a descrambling authorization to the addressable converter AC. Typically, the first message text is a promotion of the upcoming pay-per-view event as displayed on the television receiver R' of FIG. 1B including information, such as a telephone number which may be used by the local cable subscriber to request the pay-per-view event.

In response to a subscriber request for the advertised pay-per-view event, the terminal addressing computer 50 of the head end system HS authorizes the subscriber's addressable converter AC for the tag identification corresponding to the requested pay-per-view event. This cable authorization results in descrambling of the pay-per-view display-channel video causing the subscriber's television receiver to lock on to the conventional sync information of the descrambled message resulting in a shift of the video display to that illustrated in the television receiver R of FIG. 1A. The shift caused by the vertical and horizontal sync information exposes the second message text acknowledging to the subscriber that the request for the pay-per-text event has been received and authorized.

Figure 4:
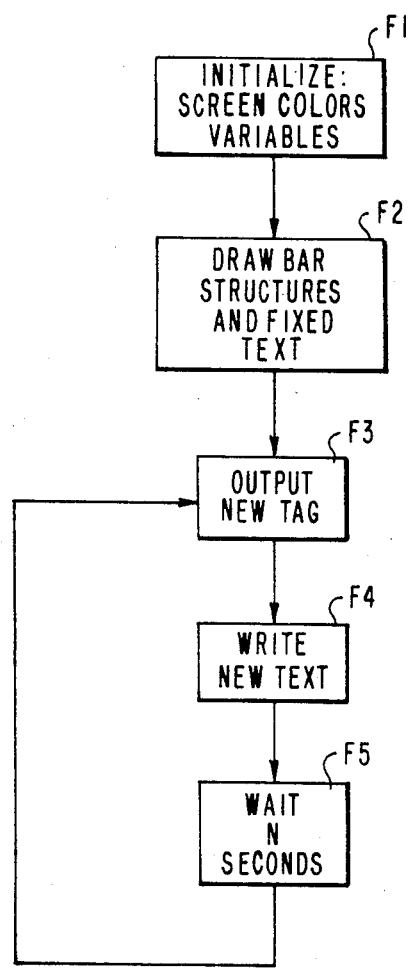
FIG. 4 is a flow diagram defining the operation of the computer program generator of FIG. 3.

The black bars of the displays are developed through the graphics capability of the computer 10 in response to programming in accordance with the flow diagram of FIG. 4. After initializing the screen colors and variables, the computer program depicted in FIG. 4 provides for the drawing of the bars and the insertion of the fixed message texts seen in FIGS. 1A and 1B. The computer program enters into a loop which outputs the tag information to the encoder 30 via a parallel output port, enters the text messages associated with the particular pay-per-view event for display on the television receiver, and waits for a predetermined time, i.e., several seconds, before changing the tag identifier and the text for a subsequent pay-per-view event. This loop runs continuously for several hours or days, until the information is to be updated.

While television programs delivered in broadcast and cable generally have interlaced sync, it is also possible and sometimes desirable to use non-interlaced sync for the presentation of text information. The computer 70 generates non-interlaced, non-standard sync information which can be applied directly to the cable television modulator 20 to produce a vertical and horizontal bar arrangement as illustrated in the cross pattern of the video displays of FIGS. 1A and 1B. Alternatively, standard interlaced sync or any other sync can be used.

The technique described above can be used with standard cable equipment such as is found in most cable systems. The sync suppression converters used in many cable systems are usable directly with the novel technique. No additional equipment is required at the site of the local subscriber and very little additional equipment is required at the head end system HS. This technique can be employed in any system presently using addressable converter-decoders for pulsed sync-suppression, sinewave sync-suppression or sync offset. The last category applies to baseband scrambling and descrambling equipment.

Systems that normally use more sophisticated forms of scrambling, such as switching between different amounts of sync suppression, i.e., 0, 6 and 10 dB, and baseband scrambling systems that do black-to-white inversion or time permutation, can also benefit from the disclosed invention. These systems would employ the simplest form of sync suppression or sync offset on the pay-per-view display channel, along with the tag identifier intended for use with the specific pay-per-view event. The actual pay-per-view event can be delivered with the more complicated form of scrambling so long as the program is tagged with the same tag used to promote the event and acknowledge the order.

The tag-identified scrambled message technique described above for addressable converters with decoders that pass scrambled signals to the television receiver is also applicable to converters having decoders which block the passage of scrambled signals. The implementation of the novel technique for the latter type of decoder is achieved by scrambling only the acknowledge message text of a tagged vent. The promotion message text of the tagged event is not scrambled and is displayed for subscriber viewing on a periodic basis. In the absence of a subscriber order, the display would be blank during the period allocated for display of the acknowledge message text. A subscriber order for the promoted event results in authorization to the addressable converter-decoder to descramble the correspondingly tagged acknowledge message text causing the acknowledge message text to be displayed for subscriber viewing.

What is claimed is:

1. A method for promoting upcoming pay-per-view events from a cable system head end and acknowledging a request for a pay-per-view event on the television screen of a cable television subscriber served by an addressable converter, comprising the steps of:

generating a video pattern at the cable system head end having at least a first and second message text associated with a pay-per-view event;

developing and assigning a tag identification specific to said pay-per-view event;

transmitting said video pattern from said cable system head end to cable television subscribers as a scrambled analog video signal to the subscriber's television via a channel of the subscriber's addressable converter, said video pattern including sync information to produce a stable display of said scrambled video pattern on the subscriber's television;

displaying said first message text of the video pattern as a stable, readable message on the subscriber's television in response to said sync information in the absence of a request by the subscriber to receive said pay-per-view event; and acknowledging a subscriber's request to receive said pay-per-view event by descrambling said video pattern and causing said second message text of the video pattern to be displayed on the subscriber's television as a stable, readable message.

2. In a cable television system offering pay-per-view events to subscribers via a channel of an addressable converter, the improvement of promoting the forthcoming pay-per-view events from a cable system head end and acknowledging a subscriber's request for the event on the subscriber's television, the combination of:

a cable system head end including:

means for generating a video pattern at the cable system head end having at least a first and second message text associated with a pay-per-view event;

means for developing and assigning a tag identification specific to said pay-per-view event;

means for transmitting said video pattern from said cable system head end to cable television subscribers as a scrambled analog signal to the subscriber's television via a channel of the subscriber's addressable converter, said video pattern including sync information to produce a stable display of said scrambled video pattern on the subscriber's television; and means for descrambling the video pattern in response to a subscriber's request to receive said pay-per-view event;

subscriber television means for displaying said first message text of the video pattern as a stable, readable message in response to said sync information in the absence of a request by the subscriber to receive said pay-per-view event, and displaying said second message text of the video pattern as a stable, readable message to acknowledge a subscriber's request to receive said pay-per-view event.

3. A method as claimed in claim 1 wherein said video pattern further includes bar information positioned within the active portion of the television waveform to be interpreted as said sync information by the subscriber's television receiver when said video pattern is presented as a scrambled signal, said receiver locking on said bar information to produce a stable video picture and a readable first text message.

4. A method as claimed in claim 3 wherein a subscriber request for a pay-per-view event results in descrambling of the video pattern associated with the tag designating the requested pay-per-view event, the subscriber's television receiver locking on the conventional sync information of the video pattern to produce a stable video picture and a readable second text message.

5. In a cable television system as claimed in claim 2 wherein said means for generating a video pattern further includes means for inserting bar information within the active portion of the television waveform to be interpreted as sync information by the subscriber's television receiver when said video pattern is presented as a scrambled signal, said receiver locking on said bar information to produce a stable video picture and a readable first message text; a subscriber request for said pay-per-view event resulting in descrambling of the video pattern associated with the tag designating the requested pay-per-view event, the subscriber's television receiver locking on the conventional sync information of the video pattern to produce a stable video picture and a readable second text message.

* * * * *